(12) United States Patent
Opdenbosch et al.

(10) Patent No.: US 8,944,103 B2
(45) Date of Patent: Feb. 3, 2015

(54) METERLESS HYDRAULIC SYSTEM HAVING DISPLACEMENT CONTROL VALVE

(75) Inventors: Patrick Opdenbosch, Peoria, IL (US); Michael L. Knussman, East Peoria, IL (US); Joshua Dierking, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 645 days.

(21) Appl. No.: 13/222,895

(22) Filed: Aug. 31, 2011

(65) Prior Publication Data

US 2013/0048117 A1    Feb. 28, 2013

(51) Int. Cl.
| F15B 13/043 | (2006.01) |
| F15B 7/00 | (2006.01) |
| E02F 9/22 | (2006.01) |

(52) U.S. Cl.
CPC ............... *F15B 7/006* (2013.01); *E02F 9/2217* (2013.01); *E02F 9/2235* (2013.01); *E02F 9/2267* (2013.01); *E02F 9/2289* (2013.01); *E02F 9/2296* (2013.01); *F15B 2211/20523* (2013.01); *F15B 2211/20553* (2013.01);
(Continued)

(58) Field of Classification Search
USPC ................. 137/596.14, 596.16, 596.18, 597, 137/625.44, 625.66, 625.48, 625.64; 251/30.02, 58; 60/444, 376; 91/388, 91/374
See application file for complete search history.

(56) References Cited

U.S. PATENT DOCUMENTS 2,114,445 A  *  4/1938  Gros ............................... 91/374
2,409,190 A  *  10/1946  Brown et al. .................... 60/444
(Continued)

FOREIGN PATENT DOCUMENTS

EP    1 598 561    11/2005
GB    2 269 425    2/1994
(Continued)

OTHER PUBLICATIONS

Linjama, M. (2011) entitled "Digital Fluid Power-State of the Art", The 12$^{th}$ Scandinavian International Conference on Fluid Power, May 18-20, 2011 Tampere, Finland.
(Continued)

*Primary Examiner* — Craig Schneider
*Assistant Examiner* — Craig J Price
(74) *Attorney, Agent, or Firm* — Finnegan, Henderson, Farabow, Garrett & Dunner LLP

(57) ABSTRACT

A hydraulic system is disclosed. The hydraulic system may have a pump, a tank, a displacement actuator having first and second chambers, a regeneration valve, and a load-holding valve. The hydraulic system may also have a displacement control valve including a valve element, and a stationary cage portion at least partially forming a high-pressure passage fluidly connecting the pump and valve element, a low-pressure passage fluidly connecting the valve element and tank, a first displacement actuator passage fluidly connecting the valve element and first chamber, a second displacement actuator passage fluidly connecting the valve element and second chamber, a load-holding control passage fluidly connecting the valve element and load-holding valve, and a regeneration control passage fluidly connecting the valve element and regeneration valve. The displacement control valve may also include a movable cage portion that is movable to selectively restrict fluid flow through only the first and second displacement actuator passages.

18 Claims, 6 Drawing Sheets

(52) U.S. Cl.
CPC ............... *F15B 2211/20561* (2013.01); *F15B 2211/20569* (2013.01); *F15B 2211/27* (2013.01); *F15B 2211/30515* (2013.01); *F15B 2211/50527* (2013.01); *F15B 2211/613* (2013.01); *F15B 2211/7053* (2013.01)
USPC ............ 137/625.64; 137/596.14; 137/596.16; 137/625.66

(56) References Cited

U.S. PATENT DOCUMENTS

| | | | |
|---|---|---|---|
| 2,597,799 | A * | 5/1952 | Howard .................... 91/374 |
| 3,000,363 | A * | 9/1961 | Hayner et al. ............. 91/374 |
| 3,191,382 | A * | 6/1965 | Weisenbach ............... 60/444 |
| 3,238,723 | A * | 3/1966 | Young ...................... 60/444 |
| 4,067,357 | A * | 1/1978 | Ruchser ................ 137/596.16 |
| 4,359,931 | A | 11/1982 | Palmersheim et al. |
| 4,369,625 | A | 1/1983 | Izumi et al. |
| 4,417,502 | A | 11/1983 | Shore |
| 4,449,366 | A | 5/1984 | Sato et al. |
| 4,561,249 | A | 12/1985 | Watanabe et al. |
| 4,586,330 | A | 5/1986 | Watanabe et al. |
| 4,768,339 | A | 9/1988 | Aoyagi et al. |
| 4,833,798 | A | 5/1989 | Ehrich |
| 4,955,283 | A | 9/1990 | Hidaka et al. |
| 5,048,293 | A | 9/1991 | Aoyagi |
| 5,205,201 | A | 4/1993 | Gollner |
| 5,329,767 | A | 7/1994 | Hewett |
| 6,330,797 | B1 | 12/2001 | Kondo |
| 6,732,513 | B2 | 5/2004 | Tajima |
| 6,745,992 | B2 | 6/2004 | Yang et al. |
| 6,789,335 | B1 | 9/2004 | Kinugawa et al. |
| 6,918,247 | B1 | 7/2005 | Warner |
| 7,243,591 | B2 | 7/2007 | Dixen et al. |
| 7,260,931 | B2 | 8/2007 | Egelja et al. |
| 7,272,928 | B2 | 9/2007 | Ariga et al. |
| 7,412,827 | B2 | 8/2008 | Verkuilen |
| 7,434,391 | B2 | 10/2008 | Asam et al. |
| 7,490,421 | B1 | 2/2009 | Pletzer et al. |
| 7,516,613 | B2 | 4/2009 | Kadlicko |
| 7,631,951 | B2 | 12/2009 | Link |
| 2004/0083629 | A1 | 5/2004 | Kondou |
| 2004/0123499 | A1 | 7/2004 | Arii |
| 2005/0012337 | A1 | 1/2005 | Yoshimatsu |
| 2005/0036894 | A1 | 2/2005 | Oguri |
| 2007/0044463 | A1 | 3/2007 | VerKuilen et al. |
| 2008/0250783 | A1 | 10/2008 | Griswold |
| 2008/0300757 | A1 | 12/2008 | Kanayama et al. |
| 2008/0302099 | A1 | 12/2008 | Vigholm et al. |
| 2008/0314038 | A1 | 12/2008 | Tozawa et al. |
| 2009/0165450 | A1 | 7/2009 | Cherney et al. |
| 2009/0288408 | A1 | 11/2009 | Tozawa et al. |
| 2010/0000209 | A1 | 1/2010 | Wada et al. |
| 2010/0000211 | A1 | 1/2010 | Ikeda et al. |
| 2010/0043420 | A1 | 2/2010 | Ikeda et al. |
| 2010/0107620 | A1 | 5/2010 | Nelson et al. |
| 2010/0115936 | A1 | 5/2010 | Williamson et al. |
| 2010/0162593 | A1 | 7/2010 | Hughes, IV et al. |
| 2010/0162885 | A1 | 7/2010 | Hughes, IV et al. |
| 2010/0163258 | A1 | 7/2010 | Hughes, IV et al. |
| 2010/0218493 | A1 | 9/2010 | Nakamura et al. |
| 2011/0029206 | A1 | 2/2011 | Kang et al. |
| 2011/0030364 | A1 | 2/2011 | Persson et al. |

FOREIGN PATENT DOCUMENTS

| | | |
|---|---|---|
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 08-049659 A | 2/1996 |
| JP | 10-96402 | 4/1998 |
| JP | 11-148463 A | 6/1999 |
| JP | 2006-118685 | 5/2006 |
| JP | 2007-247701 | 9/2007 |
| JP | 2009-121649 | 6/2009 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/028100 | 3/2010 |
| WO | WO 2010/040890 | 4/2010 |
| WO | WO 2011/041410 | 4/2011 |

OTHER PUBLICATIONS

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic und pneumatic 20 (1976) Nr. 4.

U.S. Appl. No. 13/249,932 by Bryan E. Nelson et al., entitled "Regeneration Configuration for Closed-Loop Hydraulic Systems" filed on Sep. 30, 2011.

U.S. Appl. No. 13/250,067 by Patrick Opdenbosch, entitled "Meterless Hydraulic System Having Multi-Actuator Circuit" filed on Sep. 30, 2011.

U.S. Appl. No. 13/250,250 by Patrick Opdenbosch, entitled "Meterless Hydraulic System Having Multi-Actuator Circuit" filed on Sep. 30, 2011.

U.S. Appl. No. 13/278,479 by Brad A. Edler et al., entitled "Closed-Loop Hydraulic System Having Priority-Based Sharing" filed on Oct. 21, 2011.

U.S. Appl. No. 13/250,002 by Michael L. Knussman, entitled "Closed-Loop Hydraulic System Having Energy Recovery" filed on Sep. 30, 2011.

U.S. Appl. No. 13/250,171 of Patrick Opdenbosch, entitled "Meterless Hydraullic System Having Pump Protection " filed on Sep. 30, 2011.

U.S. Appl. No. 13/278,720 of Patrick Opdenbosch, entitled "Meterless Hydraulic System Having Multi-Circuit Recuperation" filed on Oct. 21, 2011.

U.S. Appl. No. 13/278,623 of Patrick Opdenbosch, entitled "Closed-Loop Hydraulic System Having Flow Combining and Recuperation" filed on Oct. 21, 2011.

U.S. Appl. No. 13/278,924 of Patrick Opdenbosch et al., entitled "Meterless Hydraulic System Having Flow Sharing and Combining Functionality" filed on Oct. 21, 2011.

U.S. Appl. No. 13/279,064 of Patrick Opdenbosch et al., entitled "Meterless Hydraulic System Having Flow Sharing and Combining Functionality" filed on Oct. 21, 2011.

U.S. Appl. No. 13/279,177 of Patrick Opdenbosch et al., entitled "Meterless Hydraulic System Having Flow Sharing and Combining Functionality" filed on Oct. 21, 2011.

U.S. Appl. No. 13/278,556 of Michael L. Knussman, entitled "Closed-Loop Hydraulic System Having Regeneration Configuration" filed on Oct. 21, 2011.

U.S. Appl. No. 13/278,894 of Patrick Opdenbosch, entitled "Hydraulic System Having Flow Combining Capabilities" filed on Oct. 21, 2011.

U.S. Appl. No. 13/278,895 of Michael L. Knussman et al., entitled "Hydraulic System" filed on Oct. 21, 2011.

U.S. Appl. No. 13/278,939 of Michael L. Knussman et al., entitled "Hydraulic System" filed on Oct. 21, 2011.

U.S. Appl. No. 13/278,745 of Brad A. Edler et al., entitled "Closed-Loop System Having Multi-Circuit Flow Sharing" filed on Oct. 21, 2011.

U.S. Appl. No. 13/278,650 of Michael L. Knussman, entitled "Hydraulic System Having Multiple Closed-Loop Circuits" filed on Oct. 21, 2011.

U.S. Appl. No. 13/278,589 of Michael L. Knussman, entitled "Hydraulic System Having Multiple Closed-Loop Circuits" filed on Oct. 21, 2011.

U.S. Appl. No. 13/278,788 of Jeffrey L. Kuehn et al., entitled "Closed-Loop Hydraulic System Having Force Modulation" filed on Oct. 21, 2011.

U.S. Appl. No. 13/278,491 of Jeffrey L. Kuehn et al., entitled "Meterless Hydraulic System Having Sharing and Combining Functionality" filed on Oct. 21, 2011.

(56) References Cited

OTHER PUBLICATIONS

U.S. Appl. No. 13/278,935 of Michael L. Knussman et al., entitled "Hydraulic System" filed on Oct. 21, 2011.

Center for Compact and Efficient Fluid Power PowerPoint Presentation by Josh Zimmerman, PhD Student/Purdue University, Annual Meeting (Jun. 14).

Hybrid Displacement Controlled Multi-Actuator Hydraulic Systems by Joshua Zimmerman et al., The Twelfth Scandinavian International Conference on Fluid Power (May 18-20, 2011), Tampere, Finland.

Linde Hydraulics Brochure entitled "HPV-02. Variable Pumps for Closed Loop Operation", pp. 1-36.

* cited by examiner

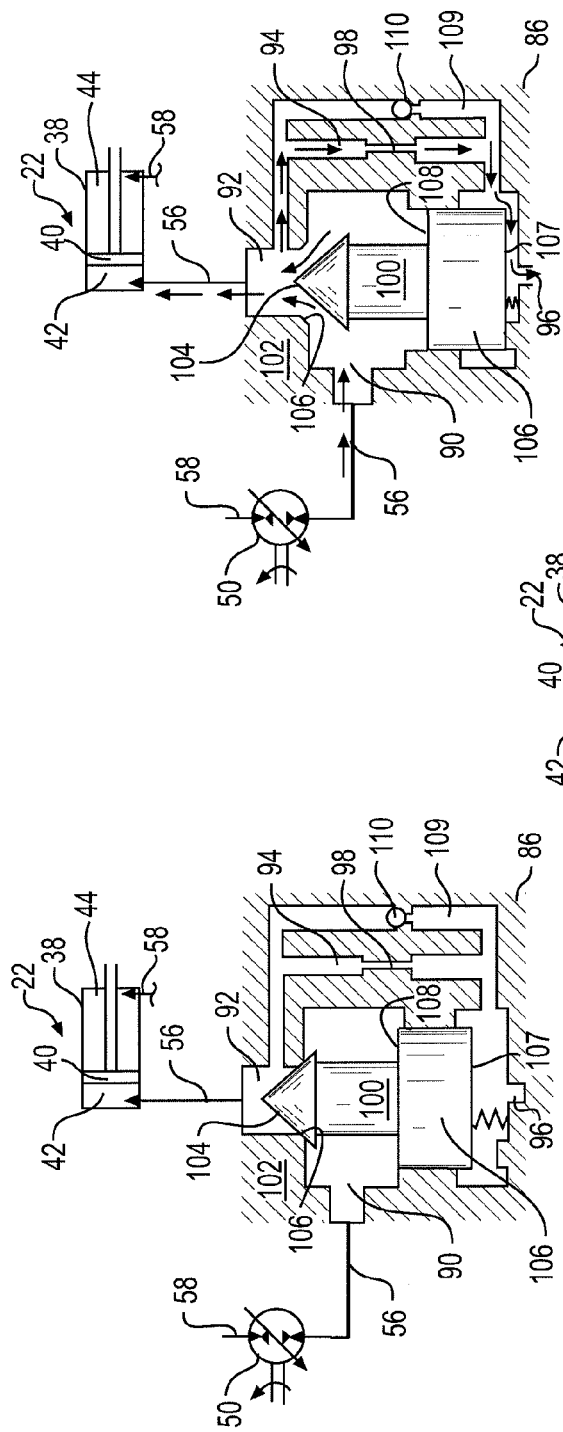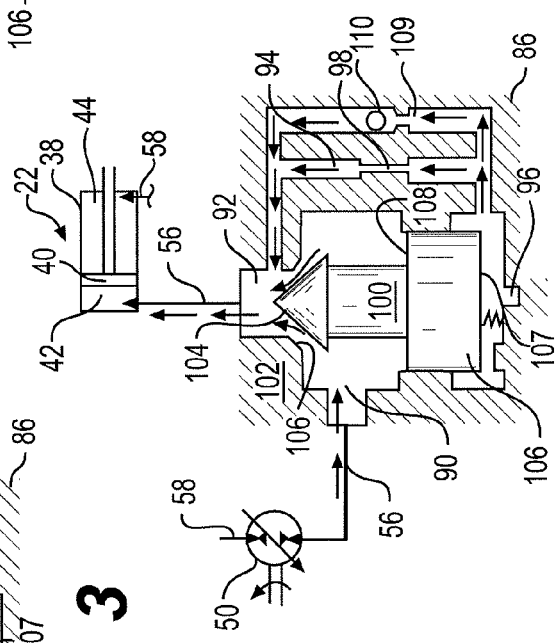

METERLESS HYDRAULIC SYSTEM HAVING DISPLACEMENT CONTROL VALVE

TECHNICAL FIELD

The present disclosure relates generally to a hydraulic system and, more particularly, to a meterless hydraulic system having a displacement control valve.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required. An exemplary meterless hydraulic system is disclosed in U.S. Patent Publication 2010/0162593 of Hughes, IV et al. that published on Jul. 1, 2010 ("the '593 publication).

Although an improvement over conventional hydraulic systems, the meterless hydraulic system of the '593 publication may still be less than optimal. In particular, the hydraulic system of the '593 publication may suffer from instabilities during transitional operations (i.e., during operations that transition between resistive and overrunning modes), pump overspeeding during operation in the overrunning mode, and/or damaging pressure spikes.

The hydraulic system of the present disclosure is directed toward solving one or more of the problems set forth above and/or other problems of the prior art.

SUMMARY

In one aspect, the present disclosure is directed to a displacement control valve. The displacement control valve may include a valve element, and a stationary cage portion surrounding the valve element. The stationary cage portion may at least partially form a high-pressure passage, a low-pressure passage, a first displacement actuator passage, a second displacement actuator passage, and at least one control valve passage. The displacement control valve may also include a movable cage portion disposed proximate the stationary cage portion. The movable cage portion may be movable to selectively restrict fluid flow through only the first and second displacement actuator passages.

In another aspect, the present disclosure is directed to a hydraulic system. The hydraulic system may include a pump, a tank, a displacement actuator having a first chamber and a second chamber, a regeneration valve, and a load-holding valve. The hydraulic system may also include a displacement control valve having a valve element, and a stationary cage portion surrounding the valve element. The stationary cage portion may at least partially form a high-pressure passage fluidly connecting the pump with the valve element, a low-pressure passage fluidly connecting the valve element with the tank, a first displacement actuator passage fluidly connecting the valve element with the first chamber of the displacement actuator, a second displacement actuator passage fluidly connecting the valve element with the second chamber of the displacement actuator, a load-holding control passage fluidly connecting the valve element with the load-holding valve, and a regeneration control passage fluidly connecting the valve element with the regeneration valve. The displacement control valve may also have a movable cage portion disposed proximate the stationary cage portion. The movable cage portion may be movable to selectively restrict fluid flow through only the first and second displacement actuator passages.

BRIEF DESCRIPTION OF THE DRAWINGS

FIGS. 3-5 are cross-sectional and schematic illustrations of an exemplary disclosed load-holding valve that forms a portion of the hydraulic system of FIG. 2;

DETAILED DESCRIPTION

Figure 1:
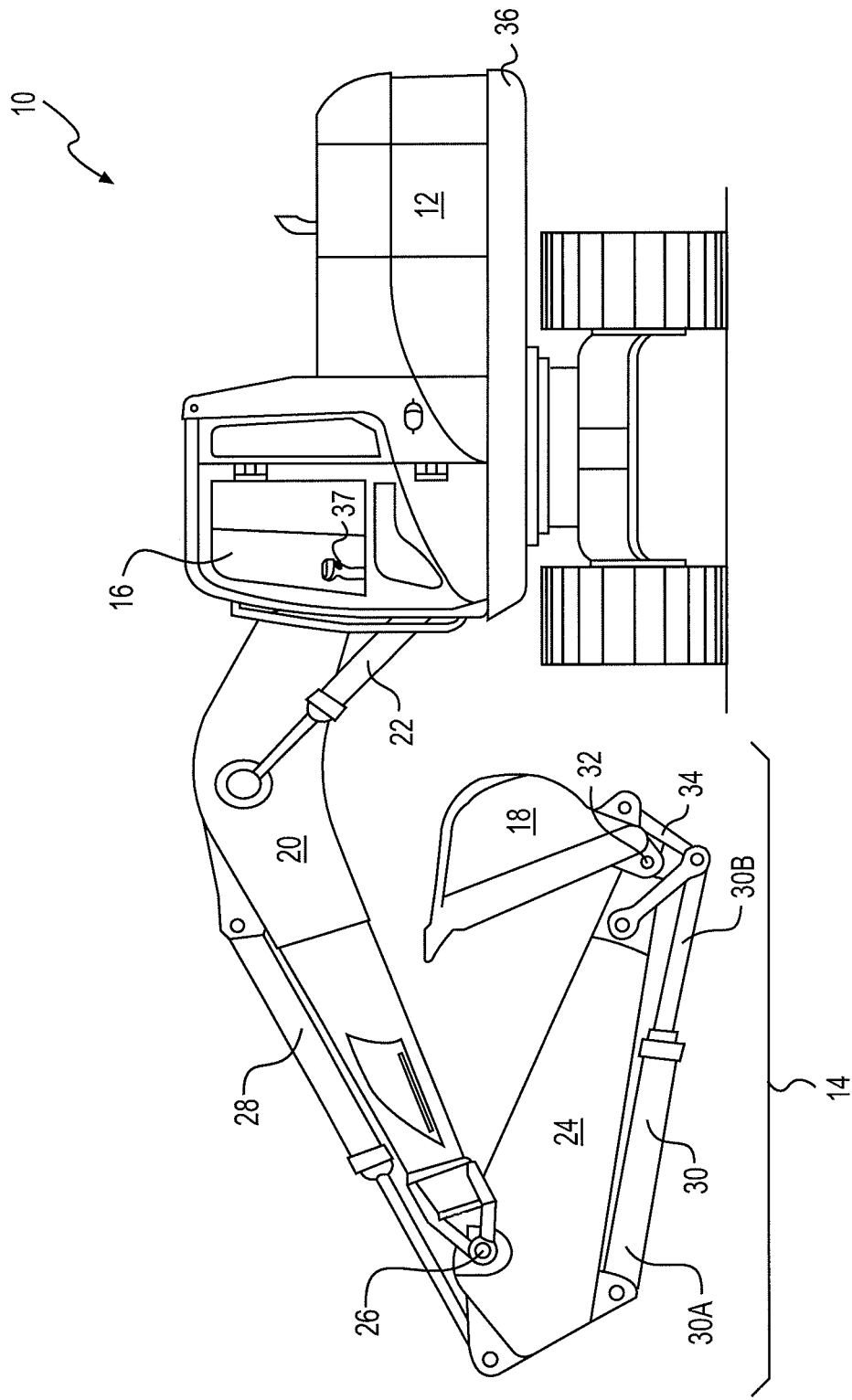
FIG. 1 is a pictorial illustration of an exemplary disclosed machine.

FIG. 1 illustrates an exemplary machine 10. Machine 10 may be a fixed or mobile machine that performs some type of operation associated with an industry, such as mining, construction, farming, transportation, or another industry known in the art. For example, machine 10 may be an earth moving machine such as an excavator (shown in FIG. 1), a backhoe, a loader, or a motor grader. Machine 10 may include a power source 12, a tool system 14 driven by power source 12, and an operator station 16 situated for manual control of tool system 14 and/or power source 12.

Tool system 14 may include linkage acted on by hydraulic actuators to move a work tool 18. For example, tool system 14 may include a boom 20 that is vertically pivotal about a horizontal boom axis (not shown) by a pair of adjacent, double-acting, hydraulic cylinders 22 (only one shown in FIG. 1), and a stick 24 that is vertically pivotal about a stick axis 26 by a single, double-acting, hydraulic cylinder 28. Tool system 14 may further include a single, double-acting, hydraulic cylinder 30 that is connected to vertically pivot work tool 18 about a tool axis 32. In one embodiment, hydraulic cylinder 30 may be connected at a head-end 30A to a portion of stick 24 and at an opposing rod-end 30B to work tool 18 by way of a power link 34. Boom 20 may be pivotally connected to a frame 36 of machine 10, while stick 24 may pivotally connect tool 18 to boom 20. It should be noted that other types and configurations of linkages and actuators may be associated with machine 10, as desired.

Operator station 16 may include devices that receive input from a machine operator indicative of desired machine maneuvering. Specifically, operator station 16 may include one or more operator interface devices 37, for example a joystick, a steering wheel, or a pedal, that are located proximate an operator seat (not shown). Operator interface devices 37 may initiate movement of machine 10, for example travel and/or tool movement, by producing displacement signals that are indicative of desired machine maneuvering. As an operator moves interface device 37, the operator may affect a corresponding machine movement in a desired direction, with a desired speed, and/or with a desired force.

Figure 2:
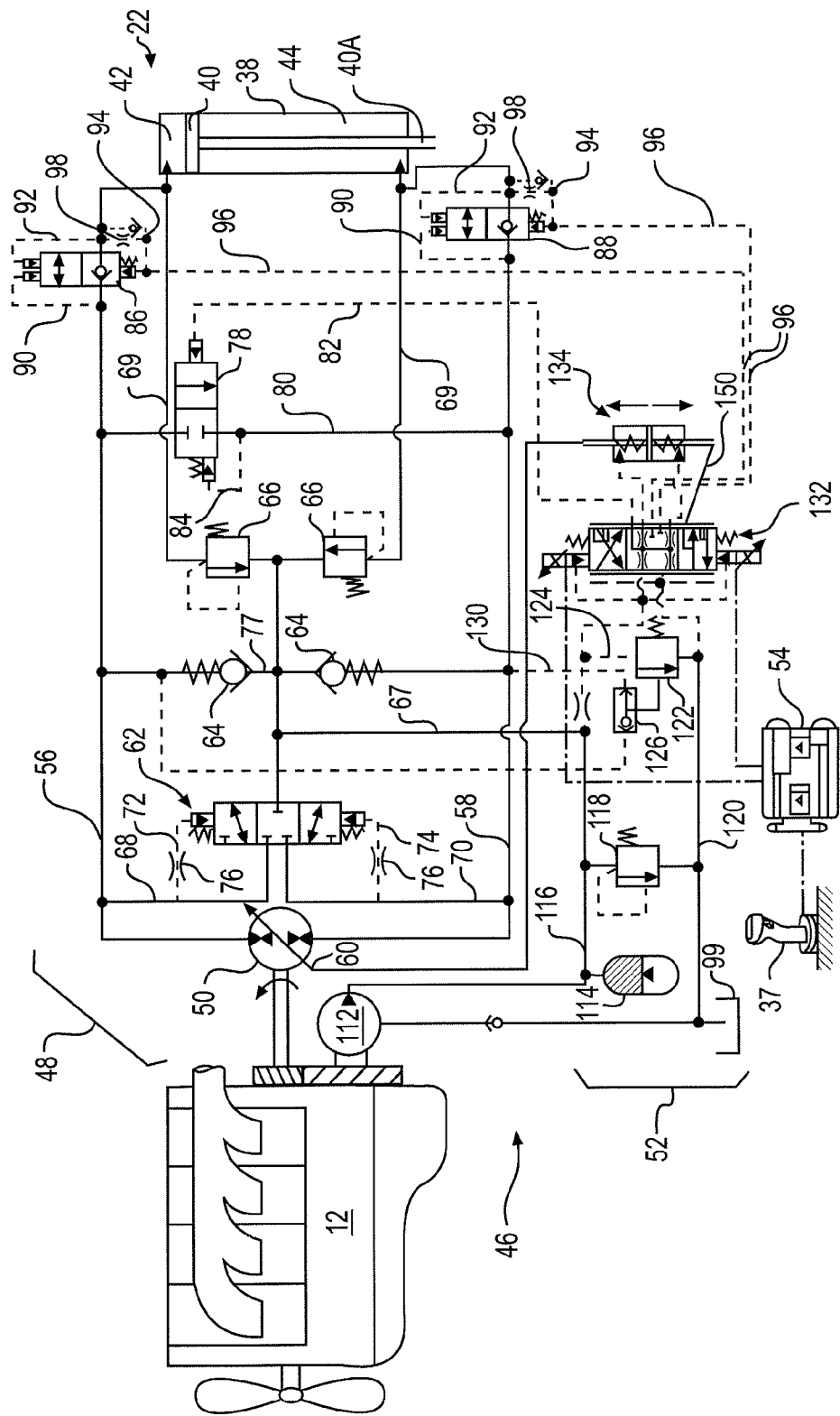
FIG. 2 is a schematic illustration of an exemplary disclosed hydraulic system that may be used in conjunction with the machine of FIG. 1.

For purposes of simplicity, FIG. 2 illustrates the composition and connections of only hydraulic cylinder 22. It should be noted, however, that hydraulic cylinders 28, 30, and/or any other hydraulic actuator of machine 10, may have a similar composition and be hydraulically connected in a similar manner, if desired.

As shown in FIG. 2, hydraulic cylinder 22 may include a tube 38 and a piston assembly 40 arranged within tube 38 to form a first chamber 42 and an opposing second chamber 44. In one example, a rod portion 40A of piston assembly 40 may extend through an end of second chamber 44. As such, second chamber 44 may be considered the rod-end chamber of hydraulic cylinder 22, while first chamber 42 may be considered the head-end chamber.

First and second chambers 42, 44 may each be selectively supplied with pressurized fluid and drained of the pressurized fluid to cause piston assembly 40 to displace within tube 38, thereby changing an effective length of hydraulic cylinder 22 and moving (i.e., lifting and lowering) boom 20 (referring to FIG. 1). A flow rate of fluid into and out of first and second chambers 42, 44 may relate to a translational velocity of hydraulic cylinder 22 and a rotational velocity of boom 20, while a pressure differential between first and second chambers 42, 44 may relate to a force imparted by hydraulic cylinder 22 on boom 20 and by boom 20 on stick 24. An expansion and a retraction of hydraulic cylinder 22 may function to assist in moving boom 20 in different manners (e.g., lifting and lowering boom 20, respectively).

To help regulate filling and draining of first and second chambers 42, 44, machine 10 may include a hydraulic system 46 having a plurality of interconnecting and cooperating fluid components. Hydraulic system 46 may include, among other things, a primary circuit 48 configured to connect a primary pump 50 to hydraulic cylinder 22 in a generally closed-loop manner, a charge circuit 52 configured to selectively accumulate excess fluid from and discharge makeup fluid to primary circuit 48, and a controller 54 configured to control operations of primary and charge circuits 48, 52 in response to input from an operator received via interface device 37.

Primary circuit 48 may include a head-end passage 56 and a rod-end passage 58 forming the generally closed loop between primary pump 50 and hydraulic cylinder 22. During an extending operation, head-end passage 56 may be filled with fluid pressurized by primary pump 50, while rod-end passage 58 may be filled with fluid returned from hydraulic cylinder 22. In contrast, during a retracting operation, rod-end passage 58 may be filled with fluid pressurized by primary pump 50, while head-end passage 56 may be filled with fluid returned from hydraulic cylinder 22.

Primary pump 50 may have variable displacement and be controlled to draw fluid from hydraulic cylinder 22 and discharge the fluid at a specified elevated pressure back to hydraulic cylinder 22 in two different directions. That is, primary pump 50 may include a stroke-adjusting mechanism 60, for example a swashplate, a position of which is hydromechanically adjusted based on, among other things, a desired speed of hydraulic cylinder 22 to thereby vary an output (e.g., a discharge rate) of primary pump 50. The displacement of pump 50 may be adjusted from a zero displacement position at which substantially no fluid is discharged from primary pump 50, to a maximum displacement position in a first direction at which fluid is discharged from primary pump 50 at a maximum rate into head-end passage 56. Likewise, the displacement of pump 50 may be adjusted from the zero displacement position to a maximum displacement position in a second direction at which fluid is discharged from primary pump 50 at a maximum rate into rod-end passage 58. Primary pump 50 may be drivably connected to power source 12 of machine 10 by, for example, a countershaft, a belt, or in another suitable manner. Alternatively, primary pump 50 may be indirectly connected to power source 12 via a torque converter, a gear box, an electrical circuit, or in any other manner known in the art.

Primary pump 50 may also selectively be operated as a motor. More specifically, when an extension or a retraction of hydraulic cylinder 22 is in the same direction as a force acting on boom 20, the fluid discharged from hydraulic cylinder 22 may be elevated and function to drive primary pump 50 to rotate with or without assistance from power source 12. Under some circumstances, primary pump 50 may even be capable of imparting energy to power source 12, thereby improving an efficiency and/or capacity of power source 12.

It will be appreciated by those of skill in the art that the respective rates of hydraulic fluid flow into and out of first and second chambers 42, 44 during extension and retraction of hydraulic cylinder 22 may not be equal. That is, because of the location of rod portion 40A within second chamber 44, piston assembly 40 may have a reduced pressure area within second chamber 44, as compared with a pressure area within first chamber 42. Accordingly, during retraction of hydraulic cylinder 22, more hydraulic fluid may flow out of first chamber 42 than can be consumed by second chamber 44 and, during extension of hydraulic cylinder 22, more hydraulic fluid may be required to flow into first chamber 42 than flows out of second chamber 44. In order to accommodate the excess fluid during retraction and the need for additional fluid during extension, primary circuit 48 may be provided with a primary makeup valve (PMV) 62, two secondary makeup valves (SMV) 64, and two relief valves 66, each connected to charge circuit 52 via a passage 67.

PMV 62 may be a pilot-operated, spring-centered, three-position valve movable based on a pressure differential between head- and rod-end passages 56, 58. In particular, PMV 62 may be movable from a first position (shown in FIG. 2) at which fluid flow through PMV 62 may be inhibited, to a second position at which fluid flow from passage 67 through PMV 62 into head-end passage 56 is allowed via a makeup passage 68, and to a third position at which fluid flow from passage 67 through PMV 62 into rod-end passage 56 is allowed via a makeup passage 70. A first pilot passage 72 may connect a pilot pressure signal from makeup passage 68 to an end of PMV 62 to urge PMV 62 toward the second position, while a second pilot passage 74 may connect a pilot pressure signal from makeup passage 70 to an opposing end of PMV 62 to urge PMV 62 toward the third position. When the pressure signal within first pilot passage 72 sufficiently exceeds the pressure signal within second pilot passage 74 (i.e., exceeds by an amount about equal to or greater than a centering spring bias of PMV 62), PMV 62 may move toward the second position, and when the pressure signal within second pilot passage 74 sufficiently exceeds the pressure signal within first pilot passage 72, PMV 62 may move toward the third position. First and second pilot passages 72, 74 may each include a fixed restrictive orifice 76 that helps to reduce pressure oscillations having a potential to cause instabilities in movement of PMV 62. PMV 62 may be spring-centered toward the first position.

It should be noted that when PMV 62 is in the first position, flow through PMV 62 may either be completely blocked or only restricted to inhibit flow by a desired amount. That is, PMV 62 could include restrictive orifices (not shown) that block some or all fluid flow when PMV 62 is in the first position, if desired. The use of restrictive orifices may be helpful during situations where primary pump 50 does not return to a perfect zero displacement when commanded to neutral. Accordingly, any reference to the first position of PMV 62 as being a flow-inhibiting position is intended to include both a completely blocked condition and a condition wherein flow through PMV 62 is limited but still possible.

Although restrictive orifices 76 within first and second pilot passages 72, 74 may help reduce instabilities associated with PMV 62, they may also slow a reaction of PMV 62. Accordingly, SMVs 64 may be provided within a passage 77 connecting passage 67 with head- and rod-end passages 56, 58 to enhance responsiveness of primary circuit 48. In the disclosed embodiment, SMVs 64 may be check type valves that are operative at set pressure differentials between passage 67 and head- and rod-end passages 56, 58, respectively. It will be appreciated that the SMVs 64 may unseat to permit flow only into primary circuit 48 when the pressure of fluid within passage 67 is greater than the pressures in head- and rod-end passages 56, 58, respectively.

Relief valves 66 may be provided to permit flow between head- and rod-end passages 56, 58 and passage 67, allowing fluid to be relieved from primary circuit 48 into charge circuit 52 when a pressure of the fluid exceeds a set threshold of relief valves 66. Relief valves 66 may be set to operate at relatively high pressure levels in order to prevent damage to hydraulic system 46, for example at levels that may only be reached when piston assembly 40 reaches an end-of-stroke position and the flow from primary pump 50 is nonzero, or during a failure condition of hydraulic system 46. Relief valves 66 may connect via relief passages 69 to head- and rod-end passages 56, 58 at or near ports of first and second chambers 42, 44, for example at locations between any load-holding check valves and hydraulic cylinder 22.

In order to help reduce a likelihood of primary pump 50 overspeeding during a motoring retraction of hydraulic cylinder 22, primary circuit 48 may be provided with at least one regeneration valve 78. Regeneration valve 78 may be disposed within a regeneration passage 80 that extends between head- and rod-end passages 56, 58, and be movable between a first or flow-blocking position (shown in FIG. 2) and a second or flow-passing position. When regeneration valve 78 is in the flow-passing position, some or all of the fluid discharged from first chamber 42 may be directly routed into second chamber 44, without the fluid first passing through primary pump 50. Regeneration valve 78 may only be moved to the flow-passing position during a motoring retraction, and movement of regeneration valve 78 may be accomplished hydraulically via pressure control of fluid within a regeneration control passage 82. That is, any time a force generated by fluid within regeneration control passage 82 acting on a first end of regeneration valve 78 exceeds a combined spring force and force from fluid within a pilot passage 84 (i.e., a force of fluid from rod end passage 58) acting on an opposing end of regeneration valve 78, regeneration valve 78 may move toward the flow-passing position. Control of the pressure within regeneration control passage 82 will be described in more detail below in connection with displacement control of primary pump 50.

First circuit 48 may be provided with load-holding valves 86 and 88 to inhibit unintended motion of tool system 14 (referring to FIG. 1). Load-holding valves 86, 88 may be associated with head- and rod-end passages 56, 58, respectively, and configured to inhibit fluid flow to and from the associated chambers of hydraulic cylinder 22, thereby locking the movement of hydraulic cylinder 22 when movement of hydraulic cylinder 22 has not been requested by the operator of machine 10. Each of load-holding valves 86, 88 may include a first or default position (shown in FIG. 2) at which substantially no fluid flow from hydraulic cylinder 22 through load-holding valves 86, 88 is allowed, and a second or active position at which flow through load-holding valves 86, 88 and movement of hydraulic cylinder 22 is substantially unrestricted. Load-holding valves 86, 88 may be urged toward their default positions when movement of hydraulic cylinder 22 is not requested, and moved toward their active positions when movement is requested.

Each load-holding valve 86, 88 may be hydraulically operated to move between the flow-passing and flow-blocking positions. In particular, each load-holding valve 86, 88 may include a pump-side pilot passage (PSPP) 90, a first actuator-side pilot passage (FASPP) 92, a second actuator-side pilot passage (SASPP) 94, and a control pilot passage (CPP) 96. A restrictive orifice 98 may be disposed within each SASPP 94 that provides for a restriction in fluid flow through SASPP 94. Pressurized fluid from within PSPP 90 and FASPP 92 may act separately on a first end of each load-holding valve 86, 88 to urge the corresponding valve toward its flow-passing position, while pressurized fluid from within SASPP 94 and CPP 96 may act together with a spring-bias on an opposing second end of each load-holding valve 86, 88 to urge the valve towards its flow-blocking position. In order to facilitate movement of load-holding valves 86, 88 from their flow-blocking positions toward their flow-passing positions, CPP 96 may be selectively reduced in pressure, for example by way of connection to a low-pressure tank 99 of charge circuit 52. When CPP 96 is connected to tank 99, fluid from within PSPP 90 and/or FASPP 92 may generate a combined force during movement of hydraulic cylinder 22 that is sufficient to overcome the spring bias of load-holding valves 86, 88 and move load-holding valves 86, 88 to the flow-passing positions. To move load-holding valves 86, 88 to their default or flow-blocking position, CPP 96 may be pressurized with fluid (or at least blocked and allowed to be pressurized with fluid from hydraulic cylinder 22), the resulting force combined with the spring bias acting at the second end of load-holding valves 86, 88 being sufficient to overcome any force generated at the opposing end of load-holding valves 86, 88. With this configuration, even if tool system 14 is loaded and generating force on hydraulic cylinder 22, any pressure buildup between load-holding valves 86, 88 and hydraulic cylinder 22 caused by the loading may be communicated with both the first and second ends of load-holding valves 86, 88 via FASPP 92 and SASPP 94, thereby counteracting each other and allowing the pressure within CPP 96 to control motion of load-holding valves 86, 88. In fact, in some embodiments, a pressure area of load-holding valves 86, 88 exposed to SASPP 94 may be greater than a pressure area exposed to FASPP 92 such that any buildup of pressure caused by the loading of tool system 14 may actually result in a greater valve-closing force (i.e., a greater force urging load-holding valves 86, 88 toward their flow-blocking positions) for a given pressure buildup. Details of the selective connection of CPP 96 to tank 99 will be discussed in greater detail below.

An exemplary load-holding valve 86 is illustrated in FIGS. 3-5. While FIGS. 3-5 illustrate only load-holding valve 86, it should be noted that the same configuration may likewise be associated with load-holding valve 88, if desired. In the illustrated embodiment, load-holding valve 86 may be a poppet-type valve having a poppet element 100 moveable within a valve block 102 between the flow-blocking position (shown in FIG. 3) at which a nose portion 104 of poppet element 100 engages a seat 106 of valve block 102, and the flow-passing position (shown in FIG. 4) at which nose portion 104 is away from seat 106.

FIG. 3 illustrates load-holding valve 86 in the flow-blocking position during a time when movement of hydraulic cylinder 22 is not being requested by the operator of machine 10 via interface device 37. At this point in time, because no request is being made by the operator, primary pump 50 may be destroked to about a zero displacement position such that a pressure of fluid within PSPP 90 is low and generating little force, if any, urging poppet element 100 toward the flow-passing position. At this same time, a load acting through tool system 14 on hydraulic cylinder 22 may generate a relatively high pressure within first chamber 42 that is transmitted to FASPP 92. This high-pressure fluid may be communicated to nose portion 104, as well as to a base portion 107 of poppet element 100 via SASPP 94. Because CPP 96 may be pressurized at this time (i.e., not connected to tank 99) and because base portion 107 may have a larger pressure area when compared with nose portion 104, a valve-closing force generated at base portion 107 by the pressurized fluid may be greater than a valve-opening force generated at nose portion 104 by the same fluid. Accordingly, poppet element 100 may be moved to and/or maintained in the flow-blocking position shown in FIG. 3.

FIG. 4 illustrates load-holding valve 86 in the flow-passing position during a time when movement of hydraulic cylinder 22 is being requested by the operator via interface device 37. At this point in time, primary pump 50 may be pressurizing fluid directed into hydraulic cylinder 22, and CPP 96 may be connected to tank 99. The high-pressure fluid acting on a shoulder portion 108 and on nose portion 104 of poppet element 100, combined with the low-pressure connection to base portion 107, may generate a force imbalance that causes poppet element 100 to move toward and/or be maintained in the flow-passing position shown in FIG. 4. It should be noted that, even though the high-pressure fluid from primary pump 50 may be communicated with base portion 107 via SASPP 94, restrictive orifice 98 may restrict flow through SASPP 94 such that pressure does not significantly build at base portion 107 and affect (i.e., inhibit) movement of poppet element 100 to the flow-passing position at this time.

FIG. 5 illustrates load-holding valve 86 in a position associated with a malfunction of hydraulic system 46. That is, CPP 96 should normally be connected with tank 99 any time PSPP 90 is pressurized. However, there may be some situations when this does not occur. For example, when pump 50 is commanded to zero displacement but, for one reason or another, pump 50 does not achieve zero displacement (e.g., when displacement actuator 134 becomes stuck), or when CPP 96 somehow becomes inadvertently pinched closed, PSPP 90 may be pressurized at the same time that CPP 96 is pressurized. During this condition, after valve element 100 is driven to the closed or flow-blocking position, pressurized fluid from pump 50 (i.e., from PSPP 90) may act on nose 104 and shoulder 108 to urge valve element 100 toward the flow passing position, while fluid from CPP 96 may simultaneously be forced by the movement of valve element 100 from CPP 96 into FASPP 92 via SASPP 94 and restrictive orifice 98. Because of the restriction of orifice 98, however, this flow of fluid from CPP 96 into FASPP 92 may be too slow, resulting in excessive pressure spikes within CPP 96 and/or PSPP 90. In order to help reduce these excessive pressure spikes during a malfunction condition, fluid from within CPP 96 may also be allowed to escape into FASPP 92 via a bypass passage 109 and check valve 110.

Returning to FIG. 2, charge circuit 52 may include at least one hydraulic source fluidly connected to passage 67 described above. For example, charge circuit 52 may include a charge pump 112 and/or an accumulator 114, both of which may be fluidly connected to passage 67 via a common passage 116 to provide makeup fluid to primary circuit 48. Charge pump 112 may embody, for example, an engine-driven, fixed displacement pump configured to draw fluid from tank 99, pressurize the fluid, and discharge the fluid into passage 67 via common passage 116. Accumulator 114 may embody, for example, a compressed gas, membrane/spring, or bladder type of accumulator configured to accumulate pressurized fluid from and discharge pressurized fluid into common passage 116. Excess hydraulic fluid, either from charge pump 112 or from primary circuit 48 (i.e., from operation of primary pump 50 and/or hydraulic cylinder 22) may be directed into either accumulator 114 or into tank 99 by way of a charge pilot valve 118 disposed in a return passage 120. Charge pilot valve 118 may be movable from a flow-blocking position toward a flow-passing position as a result of fluid pressures within common passage 116 and passage 67.

Figure 6:
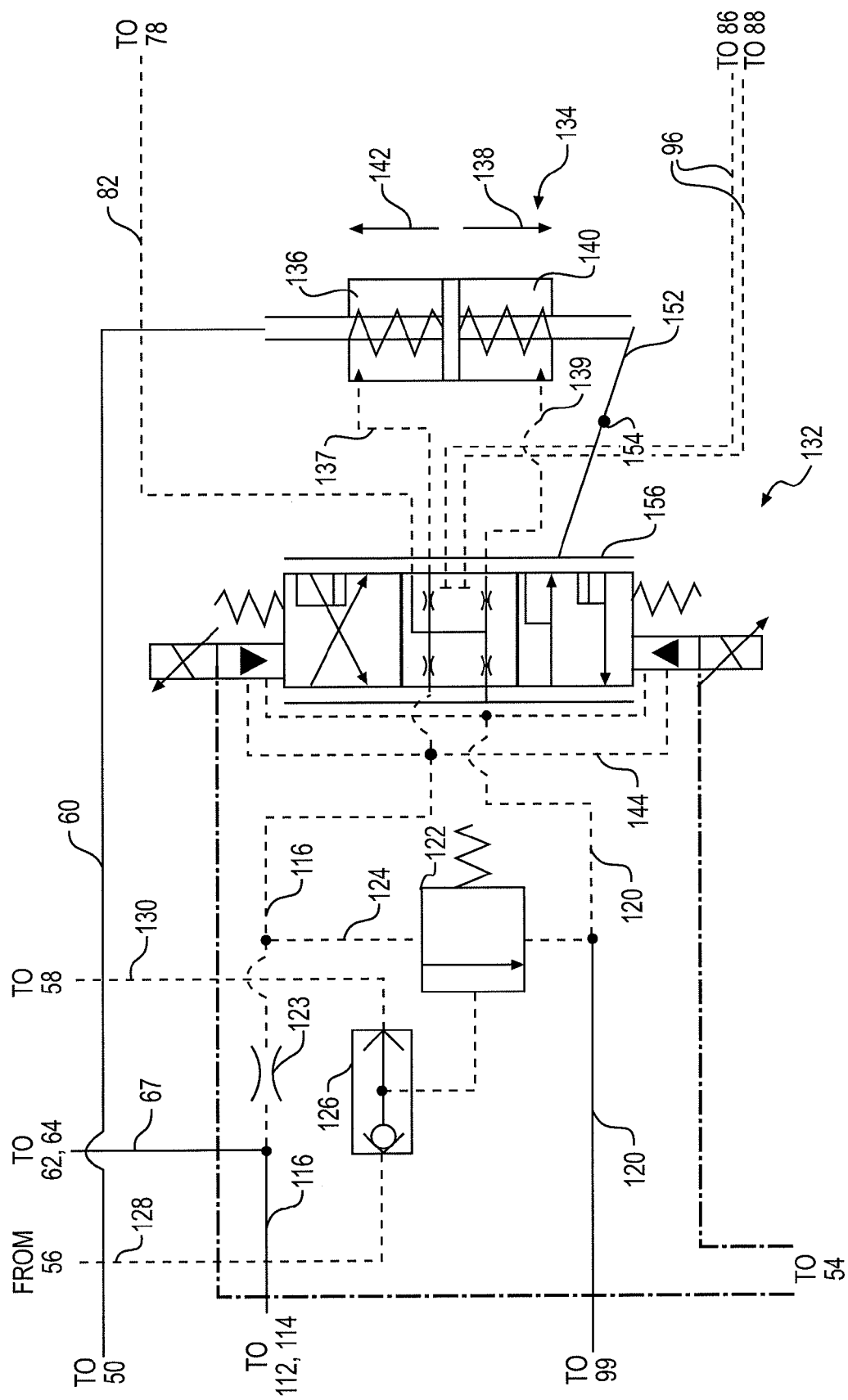
FIG. 6 is an enlarged schematic illustration of a portion of the hydraulic system of FIG. 2.

As shown in FIGS. 2 and 6, a pressure relief valve 122 may be disposed within a drain passage 124 that extends between common passage 116 and return passage 120 to regulate fluid flow from charge circuit 52 into tank 99, and a restrictive orifice 123 may be disposed within common passage 116 between passage 67 and drain passage 124. Pressure relief valve 122 may be pilot-operated and spring-biased to move between a first position at which fluid flow into tank 99 is inhibited, and a second position at which fluid is allowed to flow from common passage 116 into return passage 120. Pressure relief valve 122 may be spring-biased toward the first position, and movable toward the second position when a pressure acting on pressure relief valve 122 generates a force exceeding the spring bias of pressure relief valve 122. A resolver 126 may be disposed to selectively communicate a pilot signal via pilot passages 128, 130 from the higher-pressure one of head- and rod-end passages 56, 58 with pressure relief valve 122 to allow the signal to act on pressure relief valve 122 and urge pressure relief valve 122 toward the second position. Restrictive orifice 123 may help to dampen pressure oscillations within common passage 116 and somewhat isolate fluid makeup operations from displacement control operations associated with primary pump 50. When pressure relief valve 122 is moved to its second or flow-passing position, the pressure of fluid within passage 116 downstream of restrictive orifice 123 may drop to bring displacement actuator 134 to a lesser displacement value (possibly to zero). This will happen, for example, when hydraulic actuator 22 reaches its end of stroke position or is acting against a sufficiently high load. It should be noted that the form of override described above can also be implemented as a power-override, if desired, during which circuit pressures are not resolved but instead act simultaneously to bring the displacement of actuator 134 to a zero value.

FIG. 6 illustrates a portion of charge circuit 52 that is configured to affect displacement control of primary pump 50 and operation of load-holding valves 86, 88. In particular, FIG. 6 shows a displacement control valve 132 configured to control motion of a displacement actuator 134 that is mechanically connected to stroke-adjusting mechanism 60 of primary pump 50. In the illustrated embodiment, displacement control valve 132 is a solenoid-actuated, three-position valve that is movable by pilot pressure in response to control signals from controller 54 (referring to FIG. 2). It should be noted, however, that although displacement actuator 134 is shown and described as being electro-hydraulically controlled, it is contemplated that displacement actuator 134 may alternatively be purely mechanically or hydro-mechanically controlled, if desired.

When displacement control valve 132 is in the first position (shown in FIG. 6), the pressures within first and second chambers 136, 140 may be substantially balanced (i.e., first and second chambers 136, 140 may be exposed to substantially similar pressures) such that displacement actuator 134 is spring-biased toward a neutral position that returns the displacement of primary pump 50 to zero displacement. In particular, when displacement control valve 132 is in the first position, first and second chambers 136, 140 may be fluidly communicated with common passage 116 leading to charge pump 112 and accumulator 114 and simultaneously communicated with return passage 120 leading to tank 99. The simultaneous connection of both first and second chambers 136, 140 to common passage 116 and return passage 120 may allow for an equal amount of pressure buildup within first and second chambers 136, 140 that is less than a full pressure of common passage 116. This equal and slightly elevated, yet limited, pressure (e.g., about 2-3 MPa) within first and second chambers 136, 140 may facilitate movement of displacement control valve 132 to the neutral position while also providing for a quick displacement response of primary pump 50 during subsequent movement of displacement control valve 132 to the second or third positions. When displacement control valve 132 is moved to the first position, regeneration control passage 82 may also be connected to common passage 116 and return passage 120. Because regeneration control passage 82 may be drained of fluid (or at least exposed to a lower pressure) when displacement control valve 132 is in the first position, regeneration valve 78 may be spring-biased to its flow-blocking position, thereby inhibiting fluid flow from rod-end passage 58 to head-end passage 56 via regeneration passage 80. CPP 96 may be blocked at this time by displacement control valve 132, to facilitate movement of load-holding valves 86, 88 to their flow-blocking positions.

When displacement control valve 132 is in the second position (i.e., the position associated with downward movement of displacement control valve 132 in FIG. 6 away from the first position), fluid may be allowed to flow from charge pump 112 and/or accumulator 114 into second chamber 140 of displacement actuator 134 via common passage 116 and a pilot passage 139 to urge displacement actuator 134 to move in a first direction indicated by an arrow 142. At this same time, fluid may be allowed to drain from first chamber 136 of displacement actuator 134, from regeneration control passage 82 associated with regeneration valve 78, and from CPP 96 associated with load-holding valves 86, 88 into tank 99 via pilot passage 137 and return passage 120. Because regeneration control passage 82 may be drained of fluid when displacement control valve 132 is in the second position, regeneration valve 78 may be spring-biased to its flow-blocking position, thereby inhibiting fluid flow from rod-end passage 58 to head-end passage 56 via passage 80. CPP 96 may be unblocked at this time, to facilitate movement of load-holding valves 86, 88 to their flow-passing positions.

When displacement control valve 132 is in the third position (i.e., the position associated with upward movement of displacement control valve 132 in FIG. 6 away from the first position), fluid may be allowed to flow from charge pump 112 and/or accumulator 114 into first chamber 136 of displacement actuator 134 via common passage 116 and pilot passage 137 to urge displacement actuator 134 to move in a second direction indicated by an arrow 138 and into regeneration control passage 82. At this same time, fluid may be allowed to drain from second chamber 140 of displacement actuator 134 via pilot passage 139 and from load-holding valves 86, 88 into tank 99 via return passage 120. Because regeneration control passage 82 may be pressurized with fluid when displacement control valve 132 is in the third position, regeneration valve 78 may be moved to its flow-passing position, thereby allowing fluid flow from rod-end passage 58 to head-end passage 56 via regeneration passage 80. CPP 96 may be unblocked at this time, to facilitate movement of load-holding valves 86, 88 to their flow-passing positions.

Displacement control valve 132 may be spring-biased toward the first position and selectively moved by pressurized fluid from common passage 116 acting on ends of displacement control valve 132 via a pilot passage 144 into the second and third positions based on signals from controller 54. Flows of pressurized fluid into first and second chambers 136, 140 of displacement actuator 134 that are achieved when displacement control valve 132 is in the first and second positions, respectively, may affect the motion of displacement actuator 134. Those of skill in the art will appreciate that the motion of displacement actuator 134 may control the position of stroke-adjusting mechanism 60, and, hence, the displacement of primary pump 50 and associated flow rates and directions of fluid flow through head- and rod-end passages 56, 58. When displacement control valve 132 is in the first position, stroke-adjusting mechanism 60 may be centered or "zeroed" by biasing forces, such that primary pump 50 may have substantially zero displacement (i.e., such that primary pump 50 may be displacing little, if any, fluid into either of head- or rod-end passages 56, 58). When displacement control valve 132 is in the second position, stroke-adjusting mechanism may be shifted upward (relative to the embodiment of FIG. 6) to provide a positive displacement of primary pump 50 (a displacement of fluid into head-end passage 56), the resulting angle or position of stroke-adjusting mechanism 60 determining a volume of fluid displaced. When displacement control valve 132 is in the third position, stroke-adjusting mechanism may be shifted downward (relative to the embodiment of FIG. 6) to provide a negative displacement of primary pump 50 (a displacement of fluid into rod-end passage 58), the resulting angle or position of stroke-adjusting mechanism 60 determining a volume of fluid displaced.

During operation, the operator of machine 10 may utilize interface device 37 (referring to FIG. 2) to provide a signal that identifies the desired movement of hydraulic cylinder 22 to controller 54. Based upon one or more signals, including the signal from interface device 37, and, for example, a current position of hydraulic cylinder 22, controller 54 may command displacement control valve 132 to advance to a particular one of the first-third positions.

Figure 7:
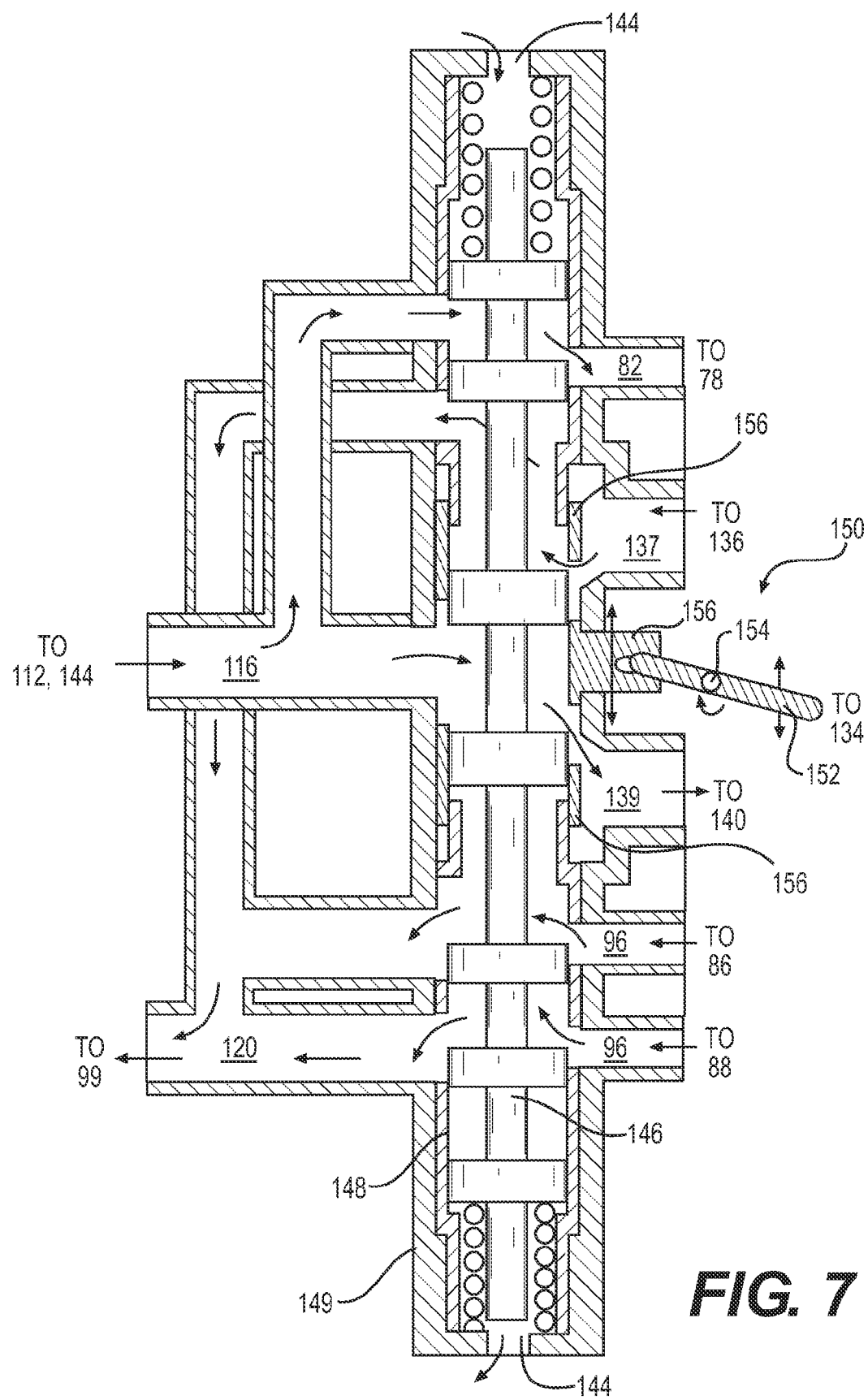
FIG. 7 is a cross-sectional illustration of an exemplary disclosed displacement control valve that forms a portion of the hydraulic system of FIG. 2.

FIG. 7 illustrates a physical embodiment of displacement control valve 132. In this embodiment, displacement control valve 132 may include a valve element, for example a spool 146, that is slidably disposed within a stationary cage portion 148. Stationary cage portion 148 may be located within a valve block 149 and at least partially define passages 82, 96, 116, 120, 137, 139, and 144, such that, as spool 146 slides lengthwise up and down (relative to FIG. 6) within stationary cage portion 148, different combinations of the passages may be interconnected. For example, FIG. 6 illustrates the third position of displacement control valve 132, wherein spool 146 is shifted downward to connect pressurized fluid from common passage 116 with passages 82 and 139 and to connect passages 137 and 96 with the low pressure of return passage 120.

In some embodiments, displacement actuator 134 may be provided with a mechanical feedback device 150 that is configured to adjust an operating state of displacement control valve 132 as displacement actuator 134 is actuated. Mechanical feedback device 150 may include a link 152 that is pivotally restrained at a midpoint 154, and a movable cage portion 156 that is connected to a first end of link 152 and disposed proximate stationary cage portion 148 at passages 137, 139. In some embodiments, movable cage portion 156 may actually form a portion of passages 137, 139. Link 152 may also be connected at a second end to displacement actuator 134, such that as displacement actuator 134 translates between the positive and negative displacement positions, link 152 may pivot about midpoint 154 and cause movable cage portion 156 to slide along an outer surface of stationary cage portion 148. As movable cage portion 156 slides relative to stationary cage portion 148 in response to movement of displacement actuator 134 toward a greater displacement position, passages 137 and 139 may be increasingly restricted and eventually become blocked. In this manner, mechanical feedback device 150 may facilitate incremental movement of displacement actuator 134 in response to movement of displacement control valve 132.

Controller 54 may embody a single microprocessor or multiple microprocessors that include components for controlling operations of hydraulic system 46 based on input from an operator of machine 10 and based on sensed or other known operational parameters. Numerous commercially available microprocessors can be configured to perform the functions of controller 54. It should be appreciated that controller 54 could readily be embodied in a general machine microprocessor capable of controlling numerous machine functions. Controller 54 may include a memory, a secondary storage device, a processor, and any other components for running an application. Various other circuits may be associated with controller 54 such as power supply circuitry, signal conditioning circuitry, solenoid driver circuitry, and other types of circuitry.

Figure 8:
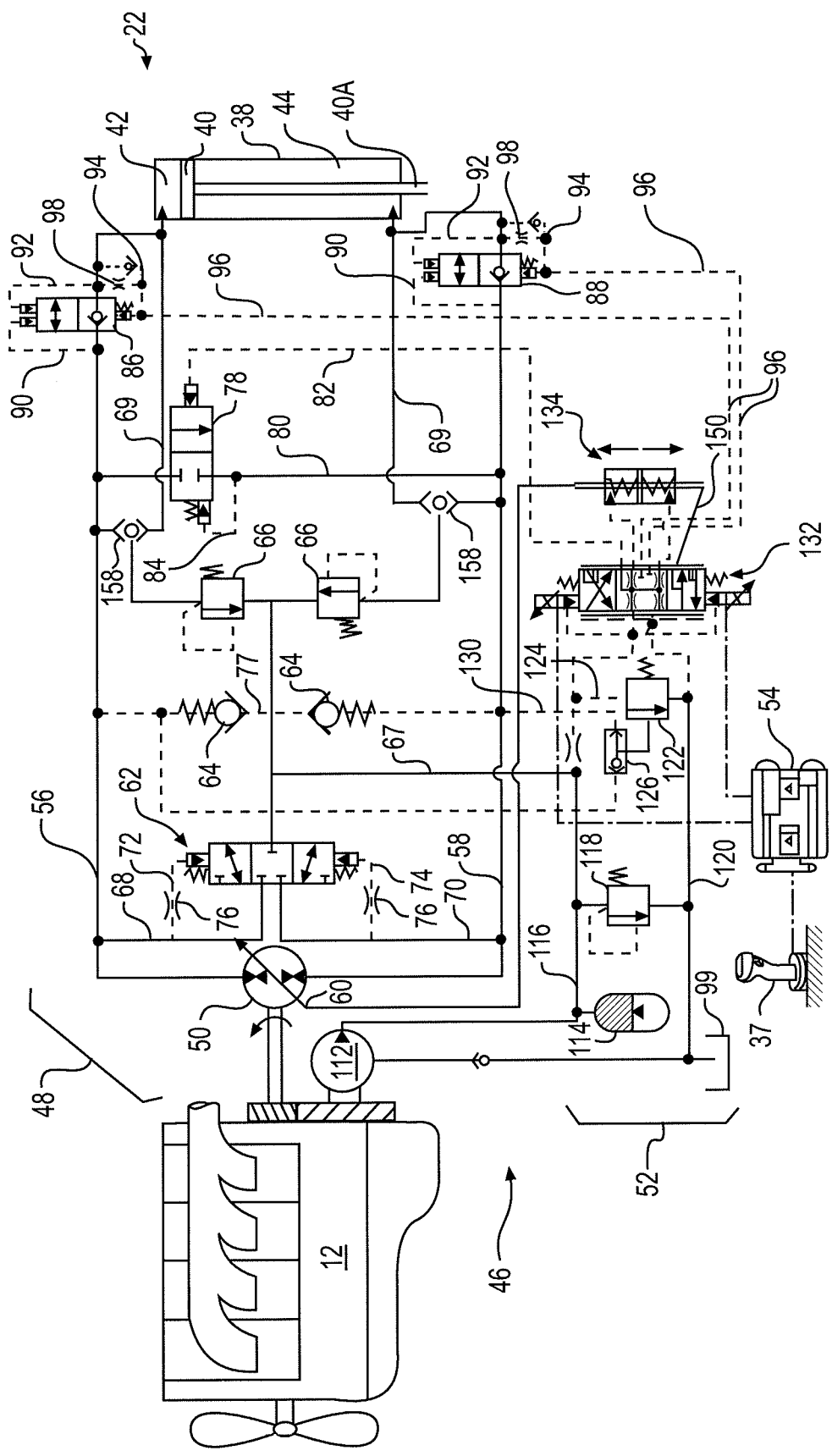
FIG. 8 is a schematic illustration of another exemplary disclosed hydraulic system that may be used in conjunction with the machine of FIG. 1.

FIG. 8 illustrates an alternative embodiment of hydraulic system 46. Similar to the embodiment of FIG. 2, hydraulic system 46 of FIG. 8 includes primary circuit 48 and charge circuit 52. In contrast to the embodiment of FIG. 2, however, primary circuit 48 of FIG. 8 may include an additional resolver 158 associated with each pressure relief valve 66. In this configuration, resolvers 158 may selectively connect head- and rod-end passages 56, 58 at the higher-pressure side of load-holding valves 86, 88, respectively, to the corresponding pressure relief valve 66. It is contemplated that passages 109 and/or check valves 110 may be omitted from the configuration of FIG. 8, if desired. With this configuration, additional protection from pressure spikes may be provided.

INDUSTRIAL APPLICABILITY

The disclosed hydraulic system may be applicable to any machine where improved hydraulic efficiency and performance is desired. The disclosed hydraulic system may provide for improved efficiency through the use of meterless technology. The disclosed hydraulic system may provide for enhanced performance through the selective use of novel primary and charge circuits. Operation of hydraulic system 46 will now be described.

During operation of machine 10, an operator located within station 16 may command a particular motion of work tool 18 in a desired direction and at a desired velocity by way of interface device 37. One or more corresponding signals generated by interface device 37 may be provided to controller 54 indicative of the desired motion, along with machine performance information, for example sensor data such a pressure data, position data, speed data, pump displacement data, and other data known in the art.

In response to the signals from interface device 37 and based on the machine performance information, controller 54 may generate control signals directed to displacement control valve 132 to move displacement control valve 132 to one of the first-third positions described above. For example, to extend hydraulic cylinder 22 at an increasing speed, controller 54 may generate a control signal that causes displacement control valve 132 to move a greater extent toward the second position, at which a greater amount of pressurized fluid from charge circuit 52 (i.e., from common passage 116) may be directed through displacement control valve 132 and into first chamber 136. The increasing amount of pressurized fluid directed into first chamber 136 may cause movement of displacement actuator 134 that increases a positive displacement of primary pump 50, such that fluid is discharged from primary pump 50 at a greater rate into head-end passage 56. At this same time, CPP 96 may be communicated with tank 99 via displacement control valve 132, such that load-holding valves 86, 88 are moved to and/or maintained in their flow-passing positions, thereby allowing the pressurized fluid within head-end passage 56 to enter first chamber 42 and the fluid within second chamber 44 to be drawn back to primary pump 50 via rod-end passage 58.

To retract hydraulic cylinder 22 at an increasing speed, controller 54 may generate a control signal that causes displacement control valve 132 to move a greater extent toward the third position, at which a greater amount of pressurized fluid from charge circuit 52 (i.e., from common passage 116) may be directed through displacement control valve 132 and into second chamber 140. The increasing amount of pressurized fluid directed into second chamber 140 may cause movement of displacement actuator 134 that increases a negative displacement of primary pump 50, such that fluid is discharged at a greater rate from primary pump 50 into rod-end passage 58. At this same time, CPP 96 may be communicated with tank 99 via displacement control valve 132, such that load-holding valves 86, 88 are moved to and/or maintained in their flow-passing positions, thereby allowing the pressurized fluid within rod-end passage 58 to enter second chamber 44 and the fluid within first chamber 42 to be drawn back to primary pump 50 via head-end passage 56.

Regeneration of fluid may be possible during retraction operations of hydraulic cylinder 22, when the pressure of fluid exiting first chamber 42 of hydraulic cylinder 22 is elevated (e.g., during motoring retraction operations). Specifically, during the retracting operation described above, when displacement control valve 132 is in the third position, the fluid of common passage 116 may be connected with regeneration valve 78. When the charge pressure in communication with regeneration valve 78 creates a force acting on regeneration valve 78 greater than a valve-closing spring-bias, regeneration valve 78 may open and allow pressurized fluid from first chamber 42 to bypass primary pump 50 and flow directly into second chamber 44. This operation may reduce a load on primary pump 50, while still satisfying operator demands, thereby increasing an efficiency of machine 10.

When an operator stops requesting movement of hydraulic cylinder 22 (e.g., when the operator releases interface device 37), controller 54 may correspondingly signal displacement control valve 132 to move to its first or neutral position. When displacement control valve 132 is in its first position, first and second chambers 136, 140 may both be simultaneously exposed to substantially similar pressures (e.g., simultaneously connected to both common and return passages 116, 120), thereby allowing displacement actuator 134 to center itself and destroke primary pump 50. At this same time, CPP 96 associated with load-holding valves 86, 88 may be blocked from tank 99 via displacement control valve, thereby allowing pressure to build within CPP 96. As the pressure builds within CPP 96, load-holding valves 86, 88 may eventually be caused to move toward their flow-blocking positions, thereby effectively holding hydraulic cylinder 22 in its current position and hydraulically locking hydraulic cylinder 22 from movement. Operation may be similar when machine 10 is turned off and/or the operator activates a hydraulic lock-out switch (not shown).

In the disclosed embodiments of hydraulic system 46, flow provided by primary pump 50 may be substantially unrestricted such that significant energy is not unnecessarily wasted in the actuation process. Thus, embodiments of the disclosure may provide improved energy usage and conservation. In addition, the meterless operation of hydraulic system 46 may allow for a reduction or even complete elimination of metering valves for controlling fluid flow associated with hydraulic cylinder 22. This reduction may result in a less complicated and/or less expensive system.

The disclosed hydraulic system may provide for stable operation of hydraulic cylinder 22. Specifically, the disclosed hydraulic system may improve stability of cylinder operation through the use of a restricted primary makeup valve. That is, the restrictions associated with PMV 62 may help to reduce pressure oscillations that occur during makeup operations. These reductions in pressure oscillations may help to stabilize movement of hydraulic cylinder 22, particularly during transitional operations when hydraulic cylinder 22 is transitioning between resistive and overrunning loads.

The disclosed hydraulic system may also provide for enhanced pump overspeed protection. In particular, during overrunning retracting operations of hydraulic cylinder 22, when fluid exiting first chamber 42 of hydraulic cylinder 22 has elevated pressures, the highly-pressurized fluid may be rerouted back into second chamber 44 of hydraulic cylinder 22 via regeneration valve 78, without the fluid ever passing through primary pump 50. Not only does the rerouting help improve machine efficiencies, but the bypassing of primary pump 50 may also reduce a likelihood of primary pump 50 overspeeding.

The disclosed hydraulic system may further provide for improved pressure protection from damaging spikes. In particular, because pressure relief of head- and rod-end passages may be provided at locations between load-holding valves 86, 88 and hydraulic cylinder 22, the likelihood of damaging pressure spikes developing in these areas is reduced.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A displacement control valve, comprising:
   a valve element;
   a stationary cage portion surrounding the valve element and at least partially forming:
      a high-pressure passage;
      a low-pressure passage;
      a first displacement actuator passage;
      a second displacement actuator passage; and
      at least one control valve passage; and
   a movable cage portion disposed proximate the stationary cage portion and being movable to selectively restrict only the first and second displacement actuator passages; and
   wherein the at least one control valve passage includes:
      a regeneration control passage; and
      a load-holding control passage; and
   wherein the valve element is movable between:
      a first position at which the first and second displacement actuator passages are simultaneously exposed to substantially similar fluid pressures;
      a second position at which the first displacement actuator passage is fluidly connected with the high-pressure passage and the second displacement actuator passage is fluidly connected with the low-pressure passage; and
      a third position at which the second displacement actuator passage is fluidly connected with the high-pressure passage and the first displacement actuator passage is fluidly connected with the low-pressure passage.

2. The displacement control valve of claim 1, wherein the first and second displacement actuator passages are simultaneously fluidly connected to both the high- and low-pressure passages when the valve element is in the first position.

3. The displacement control valve of claim 2, wherein fluid flow between the high- and low-pressure passages and the first and second displacement actuator passages is restricted when the valve element is in the first position.

4. The displacement control valve of claim 1, wherein the regeneration control passage is also simultaneously exposed to substantially similar fluid pressures as the first and second displacement actuator passages when the valve element is in the first position.

5. The displacement control valve of claim 1, wherein the load-holding control passage is blocked when the valve element is in the first position.

6. The displacement control valve of claim 1, wherein the regeneration and load-holding control passages are fluidly connected to the low-pressure passage when the valve element is in the second position.

7. The displacement control valve of claim 1, wherein:
   the regeneration control passage is fluidly connected with the high-pressure passage when the valve element is in the third position; and
   the load-holding control passage is fluidly connected with the low-pressure passage when the valve element is in the third position.

8. The displacement control valve of claim 1, further including a link connected to the movable cage portion at a first end and connectable with a displacement actuator at a second end, the link being configured to transfer motion of the displacement actuator to the movable cage portion and reduce fluid communication between the displacement control valve and the displacement actuator as the displacement actuator moves away from a neutral position.

9. The displacement control valve of claim 1, wherein:
the valve element is a spring-biased and pilot-operated spool; and
flow of fluid to the valve element is electronically controllable based on operator input.

10. A hydraulic system, comprising:
a pump;
a tank;
a displacement actuator having a first chamber and a second chamber;
a regeneration valve;
a load-holding valve; and
a displacement control valve, the displacement control valve including:
a valve element;
a stationary cage portion surrounding the valve element and at least partially forming:
a high-pressure passage fluidly connecting the pump with the valve element;
a low-pressure passage fluidly connecting the valve element with the tank;
a first displacement actuator passage fluidly connecting the valve element with the first chamber of the displacement actuator;
a second displacement actuator passage fluidly connecting the valve element with the second chamber of the displacement actuator;
a load-holding control passage fluidly connecting the valve element with the load-holding valve; and
a regeneration control passage fluidly connecting the valve element with the regeneration valve; and
a movable cage portion disposed proximate the stationary cage portion and being movable to selectively restrict only the first and second displacement actuator passages.

11. The hydraulic system of claim 10, wherein the valve element is movable between:
a first position at which the first and second displacement actuator passages are simultaneously fluidly connected to both the high- and low-pressure passages;
a second position at which the first displacement actuator passage is fluidly communicated with the high-pressure passage and the second displacement actuator passage is fluidly communicated with the low-pressure passage; and
a third position at which the second displacement actuator passage is fluidly communicated with the high-pressure passage and the first displacement actuator passage is fluidly communicated with the low-pressure passage.

12. The hydraulic system of claim 11, wherein:
fluid flow between the high- and low-pressure passages and the first and second displacement actuator passages is restricted when the valve element is in the first position; and
the regeneration control passage is also simultaneously exposed to the high- and low-pressure passages when the valve element is in the first position.

13. The hydraulic system of claim 12, wherein:
the load-holding control passage is blocked when the valve element is in the first position;
the regeneration and load-holding control passages are fluidly connected to the low-pressure passage with the valve element is in the second position; and
the regeneration control passage is fluidly connected with the high-pressure passage and the load-holding control passage is fluidly connected with the low-pressure passage when the valve element when the valve element is in the third position.

14. The hydraulic system of claim 11, further including a link connected between the movable cage portion and the displacement actuator, the link being configured to transfer motion of the displacement actuator to the movable cage portion and reduce fluid communication between the displacement control valve and the displacement actuator as the displacement actuator moves away from a neutral position.

15. The hydraulic system of claim 11, wherein the valve element is a spring-biased and pilot-operated spool.

16. The hydraulic system of claim 11, wherein:
the pump is a charge pump;
the load-holding valve is a first load-holding valve associated with the first actuator passage;
the hydraulic system further includes:
a primary pump;
a hydraulic actuator;
first and second actuator passages connecting the primary pump with the hydraulic actuator in closed loop manner; and
a second load-holding valve associated with the second actuator passage; and
the regeneration valve is disposed within a passage connecting the first and second actuator passages.

17. The hydraulic system of claim 16, further including:
an operator interface device configured to receive input regarding desired movement of the hydraulic actuator; and
a controller in communication with the operator interface device and the displacement control valve, the controller being configured to control movement of the valve element between the first, second, and third positions based on the input.

18. A hydraulic system, comprising:
a primary pump;
a displacement actuator associated with the primary pump and having first and second chambers;
a hydraulic actuator;
first and second actuator passages connecting the primary pump with the hydraulic actuator in closed loop manner;
a regeneration valve disposed within a passage connecting the first and second actuator passages;
first and second load-holding valves associated with the first and second actuator passages, respectively;
a charge pump;
a tank;
a displacement control valve including:
a valve element movable between:
a first position at which the first and second chambers of the displacement actuator and the regeneration valve are simultaneously fluidly connected to both the charge pump and the tank in a restricted manner, and flow from the first and second load-holding valves to the tank is blocked;
a second position at which the first chamber of the displacement actuator is fluidly connected with the charge pump, and the second chamber of the displacement actuator, the regeneration valve, and the first and second load-holding valves are fluidly connected with the tank; and
a third position at which the second chamber of the displacement actuator and the regeneration valve are fluidly communicated with the charge pump and the first chamber of the displacement actuator and the first and second load-holding valves are fluidly communicated with the tank;
a stationary cage portion surrounding the valve element; and
a movable cage portion disposed proximate the stationary cage portion and being movable to selectively restrict fluid flow between the valve element and the displacement actuator;
a link connected between the movable cage portion and the displacement actuator, the link being configured to transfer motion of the displacement actuator to the movable cage portion;
an operator interface device configured to receive input regarding desired movement of the hydraulic actuator; and
a controller in communication with the operator interface device and the displacement control valve, the controller being configured to control movement of the valve element between the first, second, and third positions based on the input.

* * * * *

UNITED STATES PATENT AND TRADEMARK OFFICE
CERTIFICATE OF CORRECTION

PATENT NO. : 8,944,103 B2  
APPLICATION NO. : 13/222895  
DATED : February 3, 2015  
INVENTOR(S) : Opdenbosch et al.

Page 1 of 1

It is certified that error appears in the above-identified patent and that said Letters Patent is hereby corrected as shown below:

References Cited

Page 2, Column 2, (Other Publications), line 23, delete "Hydraullic" and insert -- Hydraulic --.

Signed and Sealed this
Tenth Day of November, 2015

Michelle K. Lee
*Director of the United States Patent and Trademark Office*